(12) United States Patent
Dong et al.

(10) Patent No.: US 12,528,604 B1
(45) Date of Patent: Jan. 20, 2026

(54) HIGH-EFFICIENCY ELECTRIC TORQUE ARM DRIVE FOR UNMANNED HELICOPTERS

(71) Applicants: Dawei Dong, Petersburg, VA (US); Dawit Haile, Petersburg, VA (US)

(72) Inventors: Dawei Dong, Petersburg, VA (US); Dawit Haile, Petersburg, VA (US)

( * ) Notice: Subject to any disclaimer, the term of this patent is extended or adjusted under 35 U.S.C. 154(b) by 0 days.

(21) Appl. No.: 19/190,521

(22) Filed: Apr. 25, 2025

(51) Int. Cl.
| | | |
|---|---|---|
| B64U 10/17 | (2023.01) |
| B64C 11/18 | (2006.01) |
| B64U 30/293 | (2023.01) |
| B64U 50/31 | (2023.01) |
| B64U 50/37 | (2023.01) |
| B64U 60/40 | (2023.01) |
| B64U 60/55 | (2023.01) |
| B64U 80/70 | (2023.01) |
| B64U 80/82 | (2023.01) |

(52) U.S. Cl.
CPC ............ *B64U 10/17* (2023.01); *B64C 11/18* (2013.01); *B64U 30/293* (2023.01); *B64U 50/31* (2023.01); *B64U 50/37* (2023.01); *B64U 60/40* (2023.01); *B64U 60/55* (2023.01); *B64U 80/70* (2023.01); *B64U 80/82* (2023.01); *B64U 2201/10* (2023.01)

(58) Field of Classification Search
CPC ............................. B64U 10/17; B64U 30/293
See application file for complete search history.

(56) References Cited

U.S. PATENT DOCUMENTS

| | | | | |
|---|---|---|---|---|
| 2,696,267 | A * | 12/1954 | Mouravieff | B64C 27/18 416/22 |
| 2,845,131 | A * | 7/1958 | Laufer | B64C 27/33 416/18 |
| 2,984,304 | A * | 5/1961 | Ranson | B64C 27/18 416/22 |
| 4,702,437 | A * | 10/1987 | Stearns, Jr. | B64C 27/52 416/22 |
| 9,440,736 | B2 * | 9/2016 | Bitar | B64U 50/19 |
| 10,076,763 | B2 * | 9/2018 | Dong | B64D 1/16 |
| 10,723,449 | B2 * | 7/2020 | Dong | B64D 27/357 |
| 2019/0322368 | A1 * | 10/2019 | Melcher | B64G 1/401 |
| 2021/0291971 | A1 * | 9/2021 | Bernard | B64C 27/80 |
| 2023/0312143 | A1 * | 10/2023 | Wu | B64C 27/57 244/17.13 |

* cited by examiner

*Primary Examiner* — Christopher P Ellis
(74) *Attorney, Agent, or Firm* — THE KLINE LAW FIRM; Keith Kline

(57) ABSTRACT

An unmanned helicopter with a rotor disc area expanded to twice that of conventional multi-rotor drones to maximize lift generation under low Reynolds number conditions is described. Aerodynamic efficiency is further improved via airfoils known for their high lift performance in thin atmospheres. A four-blade rotor configuration with low solidity is used to minimize weight while optimizing performance. To facilitate deployment, the helicopter features a foldable transport design that remains compact during interplanetary travel and expands upon re-entry into the atmosphere. Post-landing operations are supported by a hybrid ground mobility system in which the landing gear functions as the drive train for a four-wheeled vehicle. Two coaxial air propellers, integrated into the front wheels, provide additional left-right directional control during both flight and ground movement. The design of the helicopter effectively doubles the payload capacity for a given power input compared to conventional rotorcraft.

7 Claims, 10 Drawing Sheets

HIGH-EFFICIENCY ELECTRIC TORQUE ARM DRIVE FOR UNMANNED HELICOPTERS

CROSS REFERENCE TO RELATED APPLICATIONS

N/A

FIELD OF THE INVENTION

The present invention pertains generally to the field of aircraft, and more particularly is a high-efficiency electric torque arm drive for unmanned helicopters.

BACKGROUND

Low air density in certain environments presents a significant challenge for rotorcraft lift generation and payload capacity. Characteristics of extraterrestrial atmospheres may not typically match those of Earth. Of specific interest herein is the atmosphere of Mars, of interest to researchers due to its relative proximity to Earth, and the possibility that Mars may be able to support life. The atmosphere of Mars is significantly less dense than that of Earth.

Since 2014, NASA's Jet Propulsion Laboratory (JPL) has advanced Mars aerial mobility with the development of the Ingenuity helicopter, followed by the Mars Chopper, a second-generation multi-rotor drone concept released on Dec. 31, 2024. However, traditional multi-rotor drones struggle to generate sufficient lift in the low-density Martian atmosphere due to constraints in rotor disc area, tip speed (VT), and airfoil lift coefficient (CL). This disclosure addresses these challenges by utilizing a high-speed drive propeller torque arm to power a large-diameter main rotor in a free-flywheel state, significantly improving hover lift efficiency and payload capacity while maintaining a simple structure.

Low air density in certain environments presents a significant challenge for rotorcraft lift generation and payload capacity. To overcome these limitations, a novel high-efficiency electric propeller torque arm system has been developed to drive the main rotor of unmanned helicopters, enhancing their aerodynamic performance and operational efficiency on Mars and other extraterrestrial planets with a relatively low air density atmosphere.

SUMMARY

In the aircraft discussed herein, the rotor disc area is expanded to twice that of conventional multi-rotor drones, thereby maximizing lift generation under low Reynolds number conditions. Aerodynamic efficiency is further improved through the utilization of airfoils known for their high lift performance in thin atmospheres, the NASA SC(2)-1010 and OAF095 airfoils. A four-blade rotor configuration with low solidity is used to minimize weight while optimizing performance.

To facilitate deployment, the helicopter disclosed herein features a foldable transport design that remains compact during interplanetary travel and expands upon re-entry into the atmosphere. The rotor system initiates pre-rotation in advance and detaches from the carrier only after achieving the required RPM, transitioning into a self-spinning, controlled descent. This technique enables a vertical landing for enhanced stability.

Post-landing operations of the helicopter are supported by a hybrid ground mobility system, in which the landing gear functions as an independently driven four-wheeled vehicle. This design enables the helicopter to autonomously travel, e.g. to a charging station for recharging or battery replacement, thereby extending the operational capabilities of the vehicle. Two electric powered coaxial air propellers, integrated into the front wheels, provide additional left-right directional control during both flight and ground movement, enhancing maneuverability.

The large torque arm-driven autogyro design offers scalability for heavier payloads, making the helicopter adaptable not only for Mars but also for other planetary environments, including terrestrial applications such as controlled vertical landings after atmospheric re-entry. The design of this rotorcraft effectively doubles the payload capacity for a given power input compared to conventional rotorcraft. The greatly improved efficiency of the present propulsion system allows new possibilities for planetary aerial exploration.

The design of a high-lift helicopter for operation in the low air density and low Reynolds number flow conditions of atmospheres such as Mars requires key aerodynamic optimizations to maximize lift efficiency. Achieving sufficient lift in such an environment involves selecting airfoils with high lift coefficients, increasing rotor disc area, and optimizing tip speed.

To that end, the NASA SC(2)-1010 and OAF095 airfoils were selected for their excellent lift characteristics under low Reynolds numbers. These airfoils ensure an optimized lift coefficient for the rotor blades, significantly improving aerodynamic efficiency. Additionally, a large-diameter rotor was chosen to increase the overall swept rotor disc area, reducing disc loading and improving lift generation. Each rotor blade's surface area has been increased while maintaining low solidity through a four-blade configuration, further enhancing aerodynamic efficiency.

The rotor system is designed to operate in a free-flywheel state, allowing the high-speed electric propeller torque arm to drive the main rotor to its highest possible RPM. This configuration ensures that the rotor tip speed reaches optimal levels for helicopter operation in a low air density environment, such as that of Mars, and significantly increases overall lift performance. The lift per blade is governed by the equation:

$$L = \frac{1}{6} C_L \cdot S \cdot V_T^2 \cdot \rho_{(Mars)}$$

Where $C_L$ represents the lift coefficient, S is the rotor blade area, $V_T$ is the tip velocity, and $\rho_{(Mars)}$ is the Martian air density.

The system further includes an electric propeller torque arm system designed to drive the main rotor of an electric vertical takeoff and landing (eVTOL) helicopter, further enhancing efficiency and simplifying the rotor drive mechanism. This system is particularly suitable for driving the rotor in a free-spinning flywheel state. By overcoming traditional power and resistance limitations, the proposed design enables the rotor to achieve its maximum attainable speed. The proposed helicopter utilizes a 1.27-meter (50-inch) torque arm diameter rotating at 1200 RPM, allowing the rotor tip speed to reach between 140 m/s and 160 m/s or approximately 0.7 Mach number, significantly improving hover lift efficiency.

Before deployment, the helicopter remains in a folded transportation state within a carrier. Upon re-entry into Earth's atmosphere, the carrier cabin of the helicopter undergoes controlled deceleration using a deceleration rocket engine. Once the descent speed stabilizes between 10-20 m/s, the rotor blades and landing gear unfold, and the pre-drive rotation system activates to spin the rotor. Once the required RPM is achieved, the helicopter separates from the carrier and transitions into autonomous, controlled vertical landing mode.

The landing gear integrates four independent ground wheels with coaxial drive capabilities. These wheels can rotate along the vertical axis, enabling self-controlled forward and backward movement, as well as in-place turning. The system allows for autonomous navigation back to a designated charging station for battery replacement or recharging.

For emergency landings, the helicopter, designated the "Trojan-AeroSpin Mars Helicopter™" for commercial purposes, is designed with a safe autorotation landing system. In the event of a power system failure, the main rotor's total pitch is automatically reduced to the minimum, lowering the rotor blades' angle of attack to approximately 2°. At this reduced pitch, a pulling torque is generated, keeping the rotor spinning forward. A portion of the rotor disc counteracts aerodynamic forces, ensuring that when the pulling torque equals the resistance torque, the rotor maintains rotation under inertia. The helicopter then enters a controlled descent, where cyclic pitch adjustments can be made to search for a safe landing site.

The electric torque arm emergency drive function maintains rotor RPM by overcoming resistance torque, ensuring continuous autorotation. During the final landing phase, the total pitch automatically increases to maximize lift using rotor inertia, enabling a soft and controlled touchdown.

Additionally, the helicopter features multi-redundancy emergency control mechanisms, including laser radar, visual measurement, control sensors, and advanced tactile rod landing systems. This combination of autorotation and final-stage electric torque arm assistance ensures optimal autorotation landing reliability.

The novel electric propeller torque arm drive system provides significant improvements in lift efficiency, vertical landing safety, and autonomous mobility for planetary exploration. These innovations in vertical takeoff and landing (VTOL) helicopters designed for re-entry into planetary atmospheres-including Earth—are hereby applied for patent protection.

This invention introduces an advanced unmanned helicopter designed for operation on Mars and other planets with atmospheres, utilizing an electric propeller torque arm to directly drive the main rotor in a free-flywheel state. This approach eliminates the need for a traditional tail rotor system, increasing lift efficiency and enabling high-speed autorotation capabilities.

The system leverages a previously patented method in which an electric propeller torque arm rotates the main rotor, optimizing performance in variable air densities found on Mars or other planets. By driving a large-diameter rotor, the torque arm enables the rotor to achieve maximum rotational speed, significantly increasing payload capacity. This technology allows for autonomous deployment, controlled autorotation landings, and post-landing mobility, setting a new standard for extraterrestrial VTOL aircraft.

Upon atmospheric re-entry, the Mars helicopter remains in a folded storage configuration. A solid rocket booster system decelerates the vehicle to approximately 20 meters per second before the rotor blades unfold and begin pre-rotation using a disposable solid rocket booster system. Once the rotor reaches the required RPM, the helicopter separates from the carrier structure, transitioning smoothly from autorotation to powered flight.

The landing system is equally innovative, incorporating a four-wheel landing gear system that allows autonomous ground mobility after touchdown. The two front wheels feature coaxial air propellers that provide controlled vertical axis steering during flight and autorotation descent. The helicopter is capable of a direct vertical landing, e.g. on a charging station, or autonomously navigating to a power source for battery charging or replacement.

At the moment of autorotation landing, the electric propeller torque arm maximizes rotor lift, ensuring a fully autonomous landing at zero vertical velocity. The system is further enhanced by a built-in emergency drive mechanism. In the event of a main motor or power system failure, real-time fault sensors detect anomalies in motor speed, temperature, voltage, and current, automatically triggering an emergency response. The helicopter's high-energy, short-duration backup motor and battery system engages to sustain rotor rotation, mitigate descent speed, and guide the vehicle to a safe landing site.

BRIEF DESCRIPTION OF THE DRAWINGS

FIG. 2A shows the helicopter in the return re-entry cabin.

DETAILED DESCRIPTION

Traditional helicopters use liquid fuel engines to drive the main rotor via a clutch and gearbox system. This standard construction requires a tail rotor to counteract torque effects. This design is inefficient for extraterrestrial flights, which may typically be flights in very low density atmospheres, due to mechanical complexity and power constraints.

Figure 1:
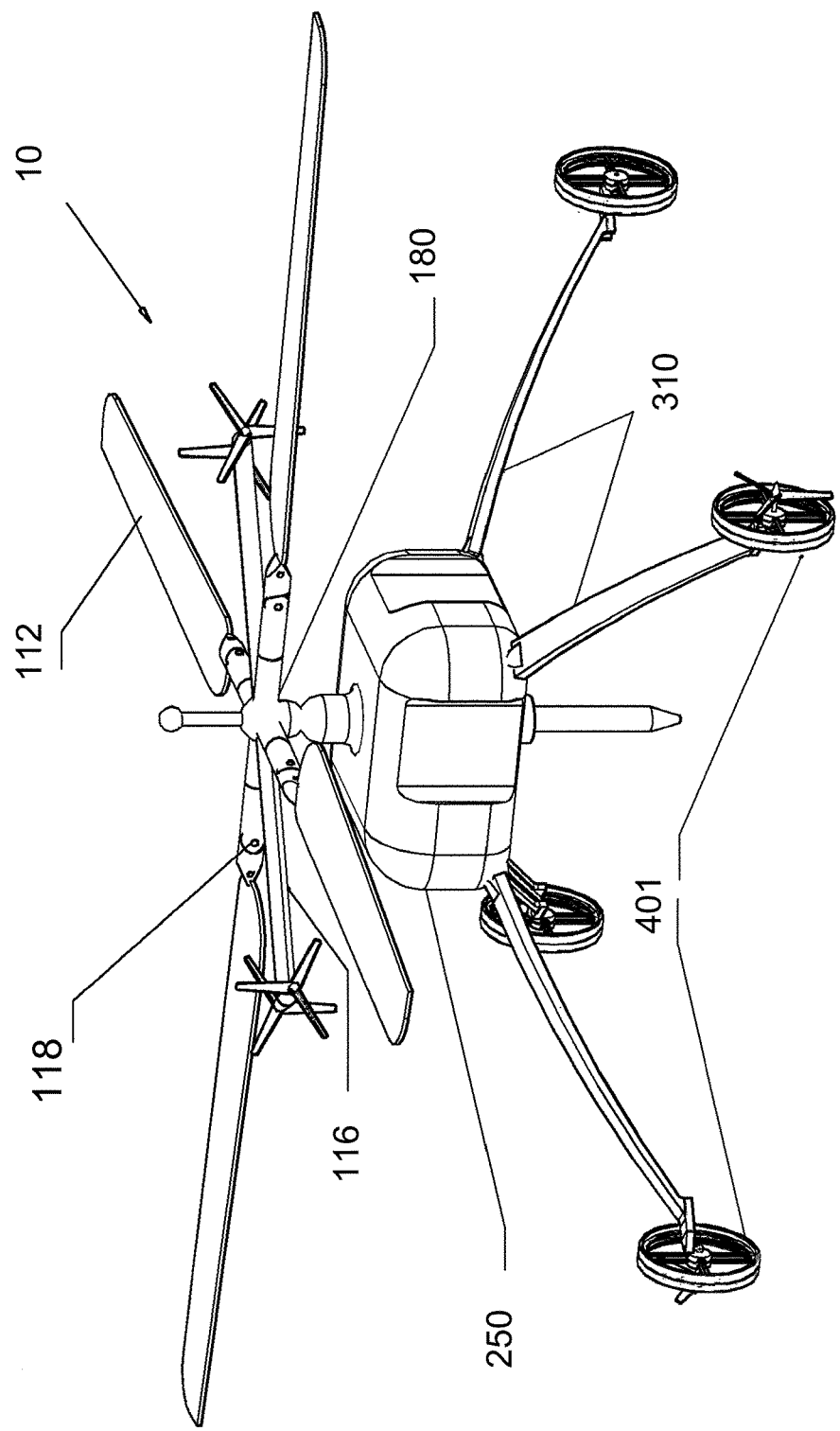
FIG. 1 is a perspective view of an unmanned helicopter as disclosed herein.

The helicopter 10 illustrated in FIG. 1, designated the "Trojan-AeroSpin Mars Helicopter™" herein and for commercial purposes, is provided with an electric propeller torque arm 116 drive system. The electric propeller torque arm 116 drive system eliminates the limitations of conventional aircraft described above by using high-speed propeller thrust to directly rotate the main rotor 112. The four-blade, high-efficiency main rotor 112 is constructed from carbon fiber composite materials. The design of the main rotor 112 provides low solidity and is optimized to provide a high-lift airfoil. The electric propeller torque arm 116 ensures rapid rotor acceleration. A tilt control system of the helicopter 10 allows precise control of the rotor blade angle-of-attack. The main rotor 112, the propeller torque arm 116, and the landing gear 310 are all affixed to a center cabin 250.

The direct drive configuration of the main rotor 112 allows the helicopter 10 to operate without a tail rotor due to the maximization of RPM and lift efficiency. Preliminary measured experimental results demonstrate that the electric torque arm propulsion method is significantly more efficient than either conventional helicopters or multi-rotor drones. The streamlined design simplifies mechanical complexity, reduces weight, and increases power-to-lift efficiency, making the helicopter 10 disclosed herein the optimal solution for extraterrestrial VTOL (vertical takeoff and landing) operations. The aircraft has been constructed specifically with the Mars environment in mind.

Figure 2:
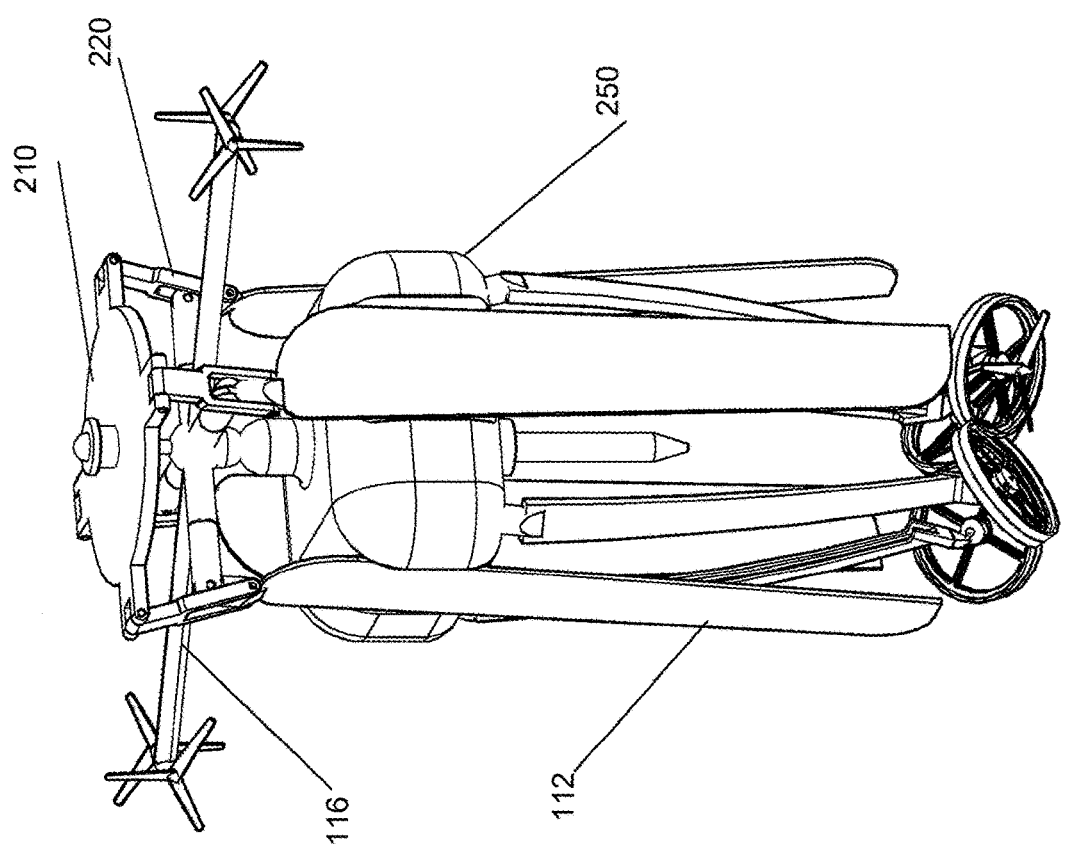
FIG. 2 illustrates the helicopter with the main rotor folded and with the landing gear structure in a stored configuration prior to deployment.
Figure 2:
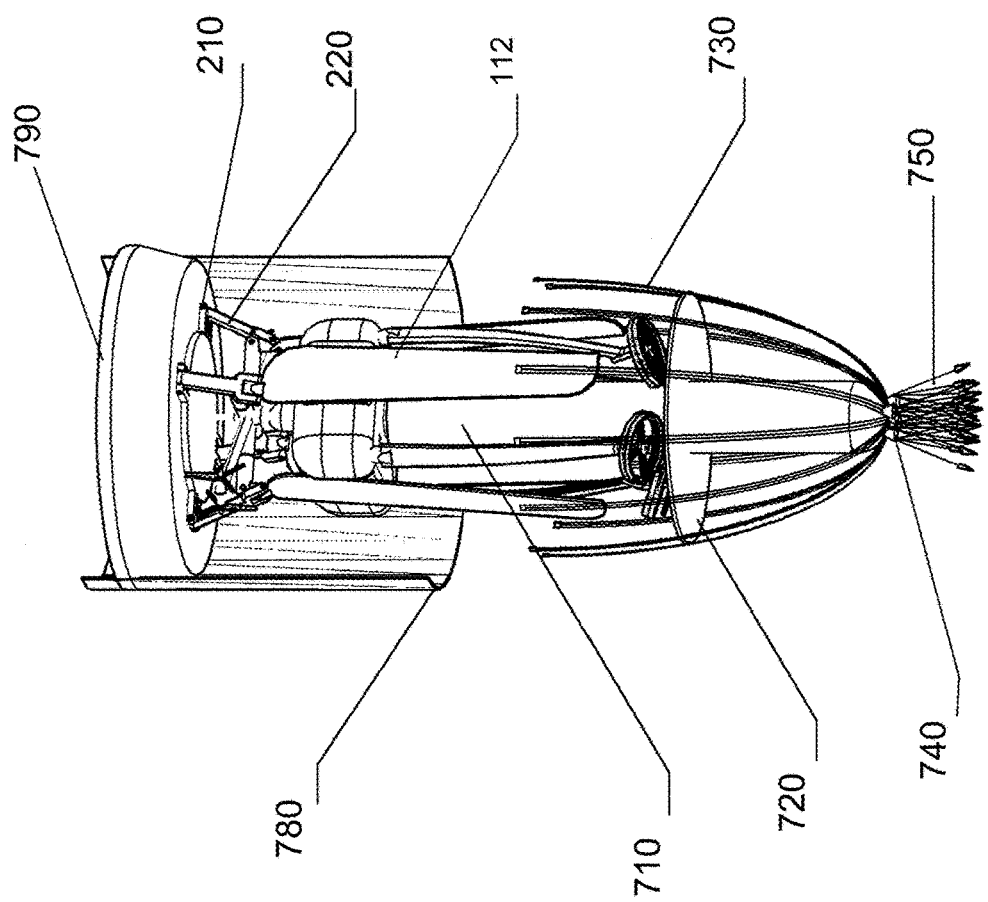

FIGS. 2 and 2A show a compact storage configuration of the helicopter 10 within a re-entry capsule 780 of a carrier aircraft (not shown). A suspension bracket 210 includes a plurality of connecting rods 220, and is affixed to a central disk 790 of the re-entry capsule 780. The connecting rods 220 are hingedly connected to the suspension bracket 210. The plurality of connecting rods 220 are also in communication with the blades of the main rotor 112. When a deployment sequence is initiated by a wired or wireless signal relayed through the center cabin 250, the connecting rods 220 are pulled upward by the suspension bracket 210 affixed to the central disk 790 as the re-entry capsule 780 is raised relative to the stored helicopter 10. The raising of the connecting rods 220 causes the blades of the folded main rotor 112 to be raised toward their fully extended positions. The connecting rods 220 retract toward the suspension bracket 210 as the re-entry capsule 780 is pulled upward. Simultaneously, an outer bracket partition 720 that holds an outer bracket frame 730 around the folded helicopter 10 retracts downward. When the main rotor blades have opened, connecting rods 220 fold upwards toward the suspension bracket 210 so as to not affect the rotation of the main rotor blades, and then enter a standby state. The retractable rotor deployment system described above ensures a controlled unfolding sequence upon atmospheric entry. During deployment, the rotors 112 are moved from their stored position illustrated in FIGS. 2 and 2A to their fully deployed position shown in FIGS. 1 and 3. When deployment is complete, the helicopter rotor blades begin to rotate, and the helicopter center fixed tube 710 and the front fairing are separated from the helicopter. The helicopter 10 rotates and separates from the reentry cabin, entering a controllable flight state of autorotation descent.

Figure 3:
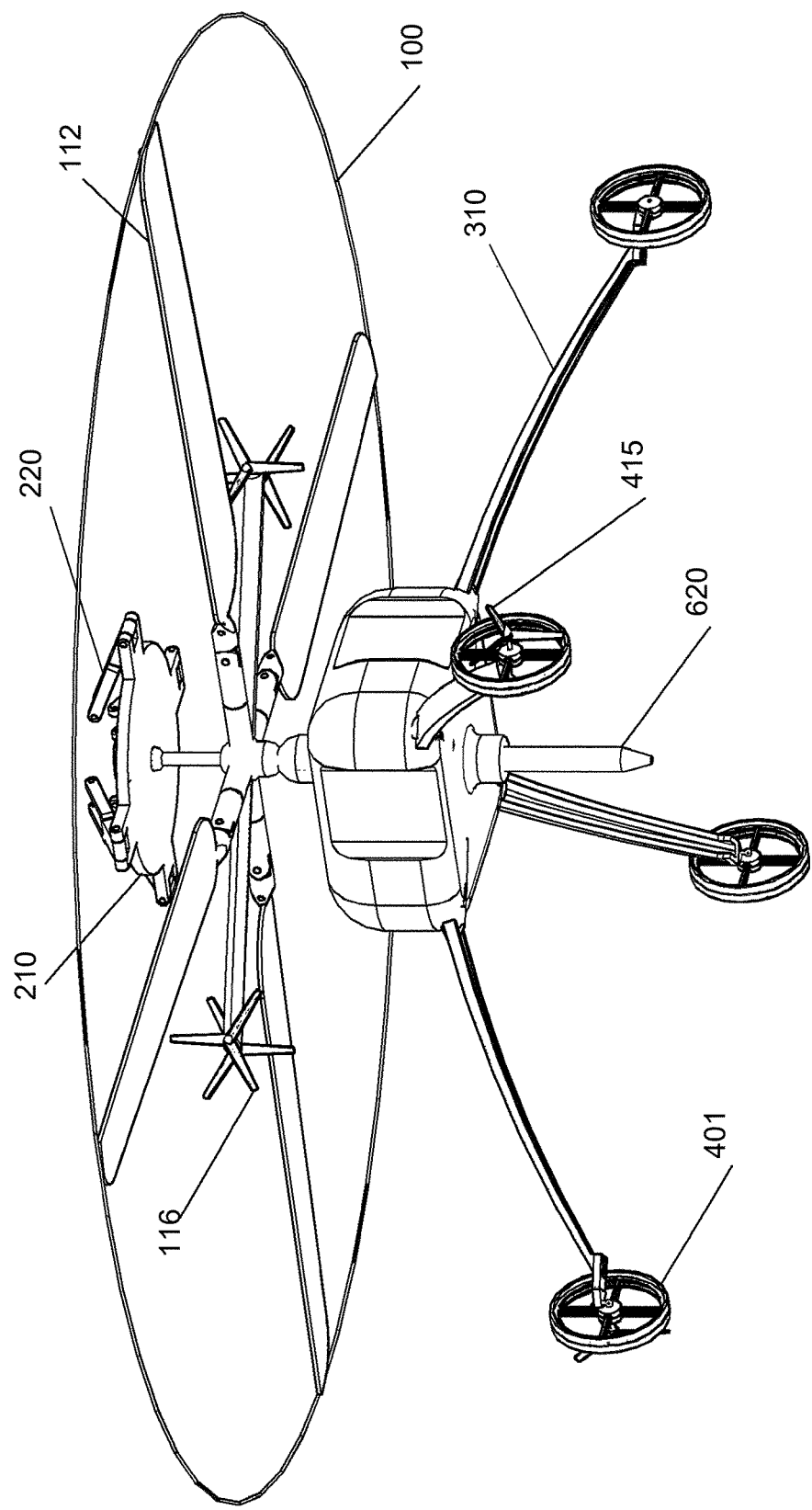
FIG. 3 depicts a deployment sequence of the device, showing the suspension arm retracting, main rotor unfolding, and rotor pre-spinning process driven by the electric propeller torque arm before separation from the re-entry capsule.

FIG. 3 further details the rotor pre-spin activation, demonstrating the transition from stored mode to flight mode. FIG. 3 shows the circular plane 100 defined by the rotation of the main rotor system 112. The super-large-diameter main rotor system 112 and the heavy-lift planetary helicopter employ a central-cylinder bracket-type reentry cabin xx structure, which uses a solid propellant rocket engine for deceleration and braking. The planetary helicopter 10 is stored in a folded state (see FIGS. 2, 2A) on the reentry cabin cylinder xx. After deceleration of the reentry cabin cylinder xx, the folded planetary helicopter 10 unfolds from the top of the central cylinder xx and, following pre-rotation driven by the electric propeller torque arm 116, separates from the central cylinder xx and transitions into the autorotation descent flight mode.

The helicopter 10 is shown in a fully deployed configuration in FIG. 3. The main rotor system 112 and the electric propeller torque arm 116 are fully extended, defining the extra large rotation plane 100. The carbon fiber reinforced landing gears 310 are also shown in their fully deployed positions. At least one pair of the landing gears 310 are equipped with electric powered steering propellers 415. The landing gear assembly includes self-driving wheels 400 and electric powered steering propellers 415 that support navigation both while the helicopter 10 is in flight and when navigating while on the ground. The propellers 415 are typically mounted on a front pair of the wheels 400. The battery pack 620 that provides power for the helicopter 100 is also shown in FIG. 3.

Figure 4:
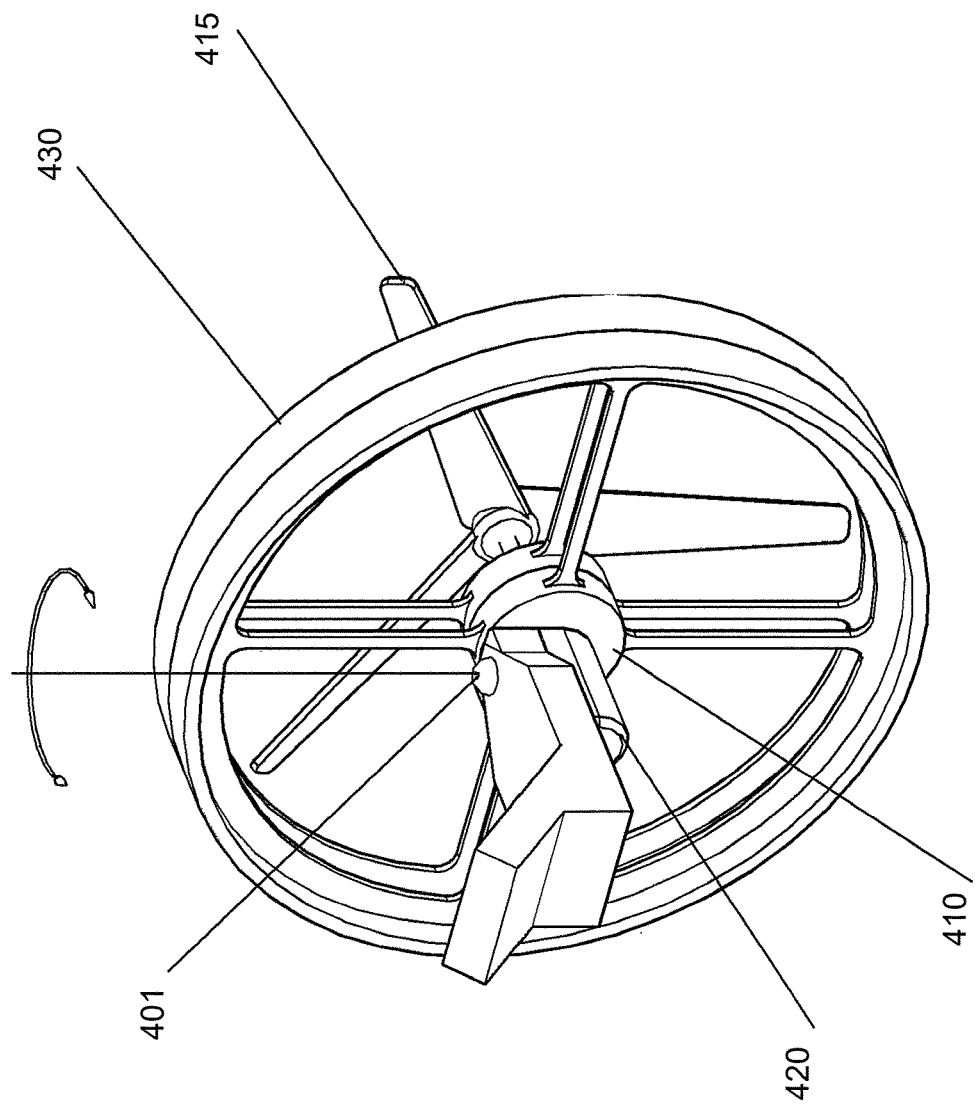
FIG. 4 shows the structure of the independent front-wheel propulsion and steering system.

FIG. 4 illustrates in detail the self-propulsion system of the helicopter 10 that is provided by the landing gear 310. The system includes self-propelled wheels 400, each with a high-efficiency planetary gear motor 410 and coaxial steering propellers 415. The steering propellers 415 operate only when steering is required, conserving electric power for the helicopter 10. These elements enable precise flight steering, automated landing adjustments, and ground maneuverability. The self-propelled wheels 400 include a steering axel 401 that operates in conjunction with a steering motor 420. The running wheel 430 is made from a carbon fiber material.

Figure 5:
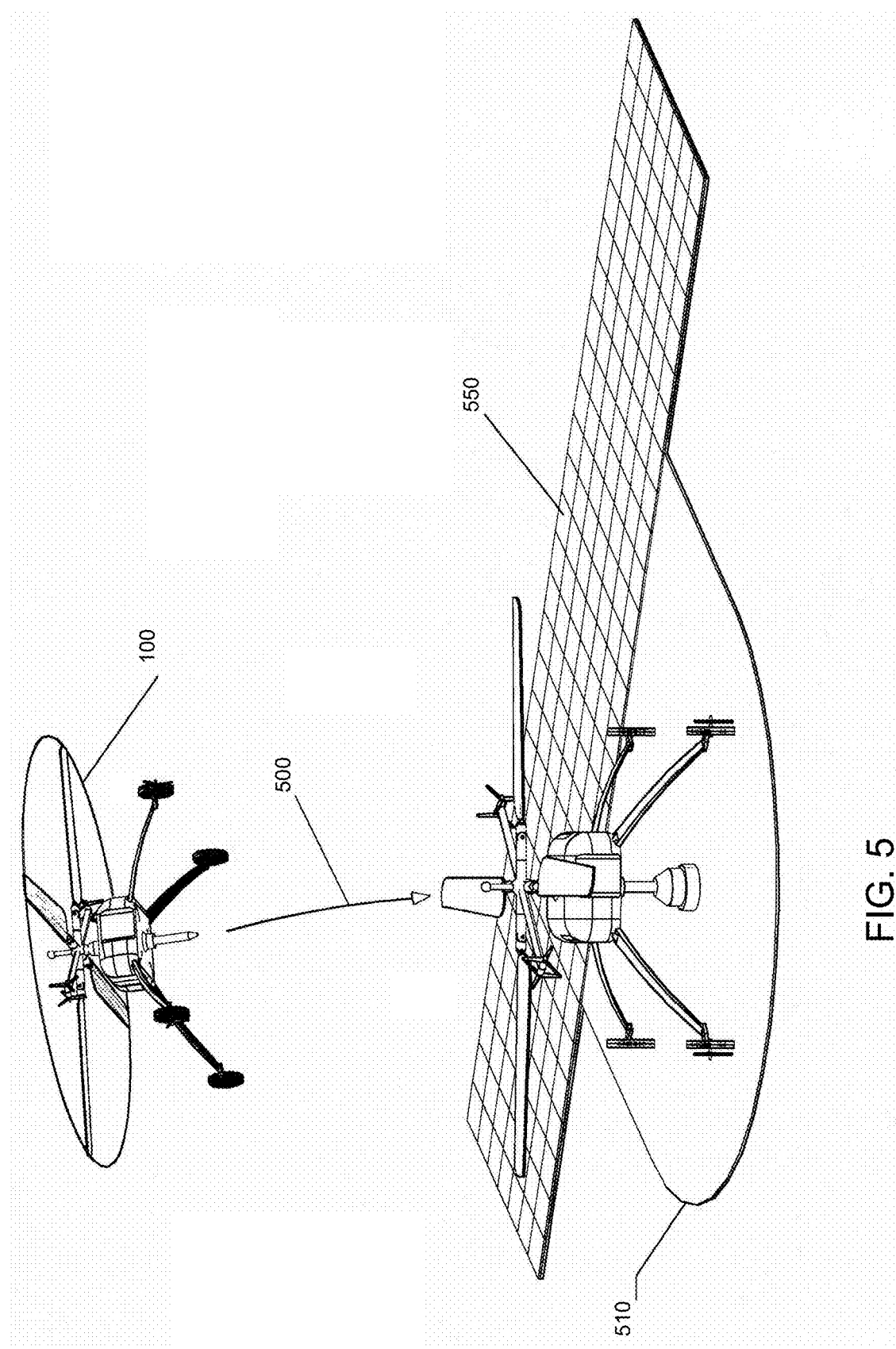
FIG. 5 is a schematic representation of the helicopter landing at a solar charging station preparatory to battery replacement or recharging.
Figure 6:
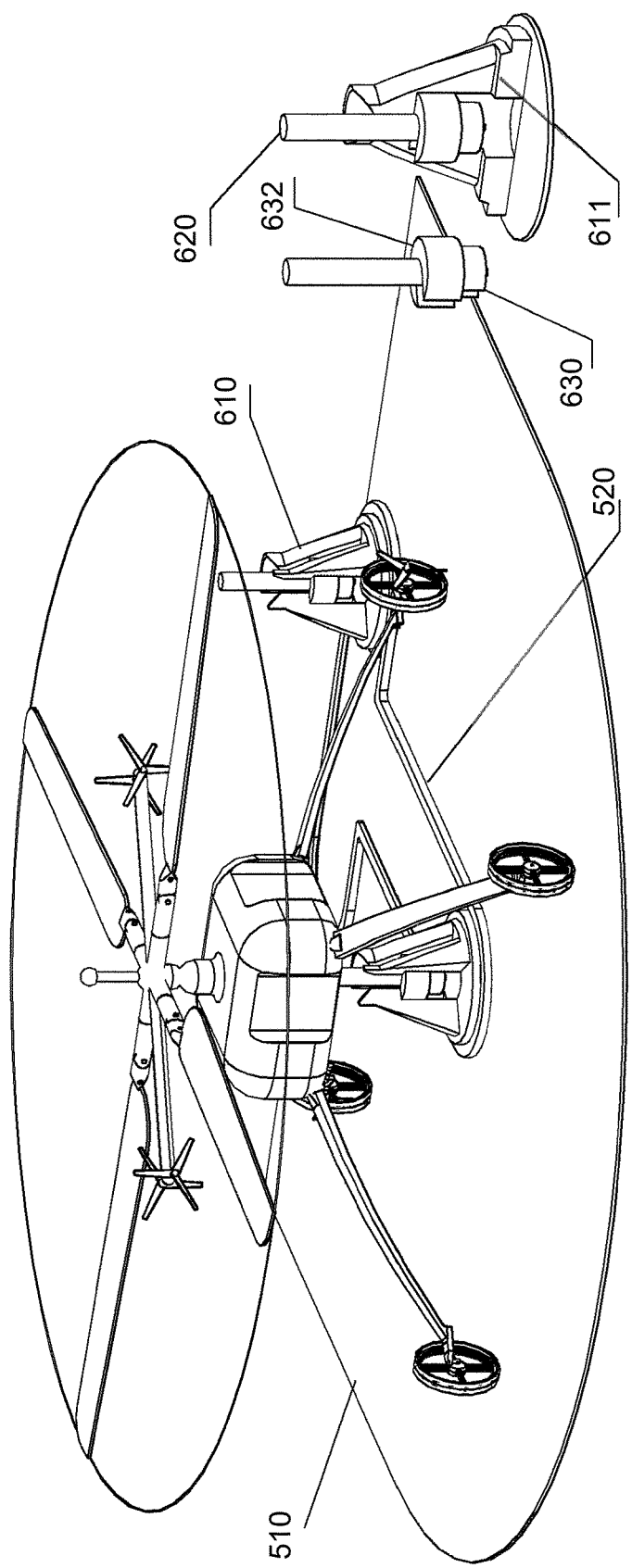
FIG. 6 depicts the helicopter in the charging station.

FIGS. 5 and 6 detail an autonomous battery charging and replacement process. In FIG. 5, the helicopter 10 is shown approaching a charging facility. The charging facility includes a landing platform 510 and an associated solar panel grid 550. Upon landing, the helicopter 10 can either dock vertically onto a charging station 610 or navigate to a designated battery swapping facility. The automated battery exchange system allows for seamless mission continuity without prolonged downtime. At least a pair of movable charging piles 610 operate along slide rails 520. A manipulator at a standby position can replace a depleted battery pack 620. When the helicopter 10 lands, a charging pile clamp 632 clamps the depleted battery pack 620, rotates the pack 620 45°, and slides the depleted battery pack 620 downward to disengage it from the helicopter 10. A first charging pile 610 then transports the depleted battery pack 620 along the mobile track 520 to a waiting position where it will be charged. Simultaneously, a second charging pile 610 transports a fully charged battery pack 620 to a central position, where the fully charged battery pack 620 is installed into the helicopter 10 by reversing the removal procedure.

If immediate redeployment of the helicopter 10 is not necessary, the charging piles 610 remain stationary, allowing the helicopter 10 to recharge directly on the landing platform 510. Alternatively, a first depleted battery 620 is placed in a recharging pile 610, and a second, fully charged battery 620 is installed in the helicopter 10.

Figure 7:
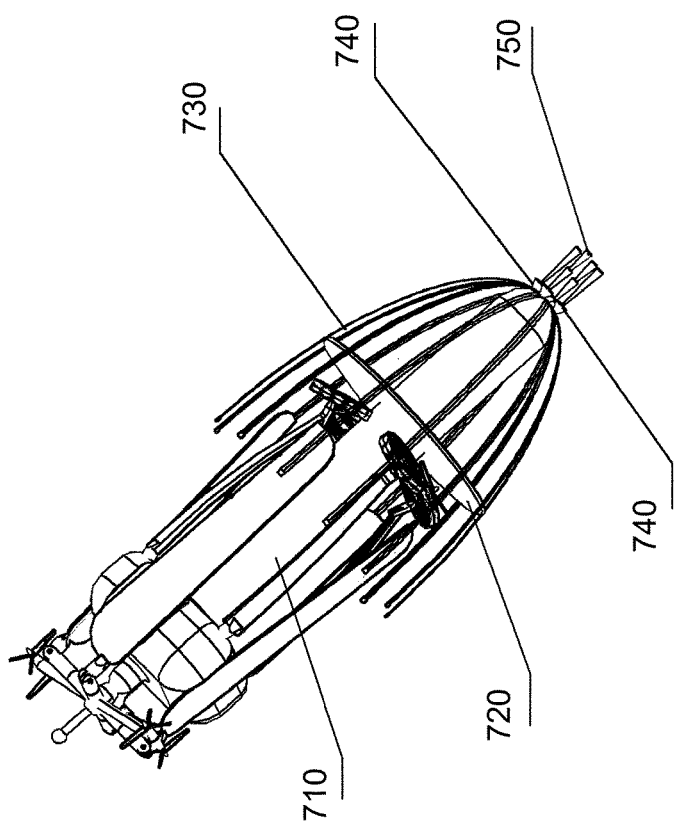
FIG. 7 is an illustration of the helicopter retracted to a re-entry position.
Figure 8:
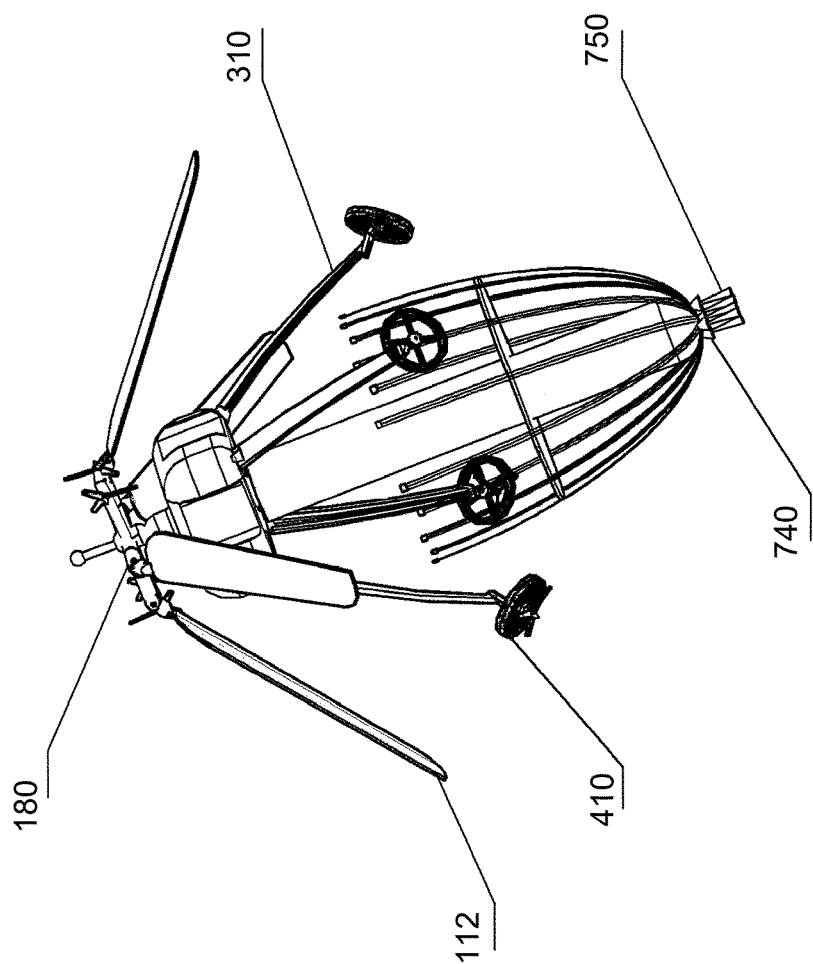
FIG. 8 depicts an opening sequence of the helicopter.
Figure 9:
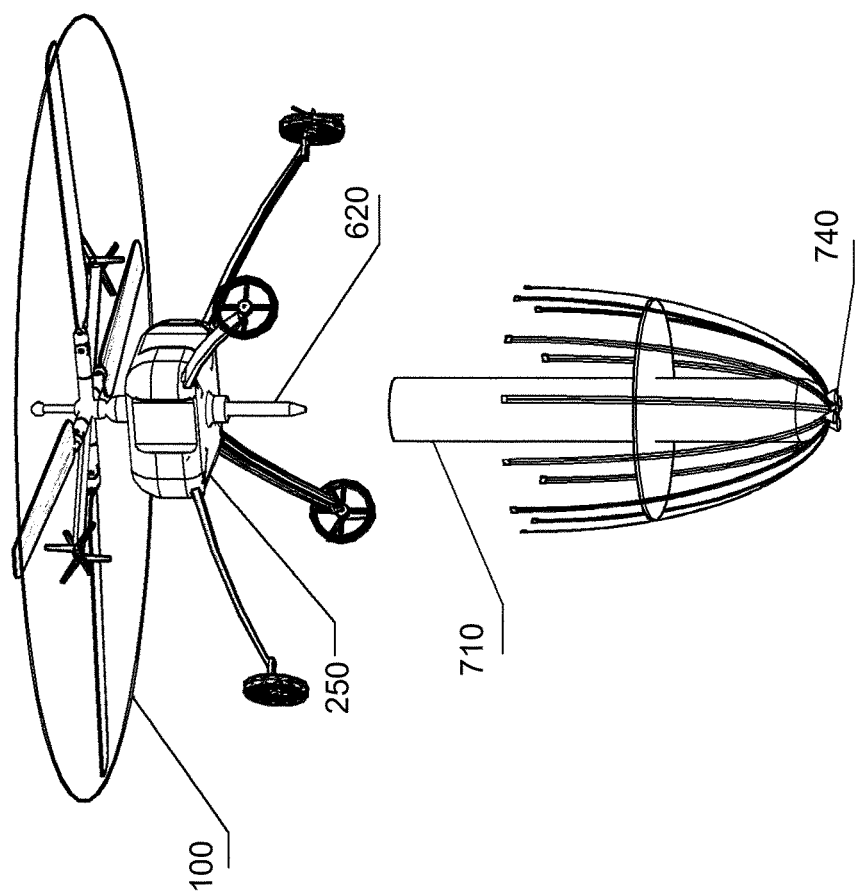
FIG. 9 is an illustration of the helicopter in a fully deployed, in flight position.

FIGS. 7-9 illustrate the deployment of the helicopter 10, from a fully closed transport position shown in FIG. 7, through the opening sequence illustrated in FIG. 8, to the fully deployed, in flight position shown in FIG. 9. This sequence occurs during the autorotation-based re-entry, demonstrating how the rotor deployment, pre-spin activation, and electric torque arm propulsion ensure a safe and controlled descent. The combination of deceleration rockets, autorotation, and torque-assisted stabilization provides an unmatched level of reliability for planetary landings.

FIG. 7 shows the helicopter 10 at the beginning of a reentry sequence. The helicopter 10 is in a stored position. The landing gear 310 and the main rotor system blades 112 are folded onto a central fixed tube 710 of the helicopter 10.

An outer bracket partition 720 holds the outer bracket frame 730 around the folded helicopter 10. The solid fuel deceleration engine 740 and its resultant flame 750 are visible at a bottom of the assembly.

As the reentry sequence continues, the helicopter 10 begins to unfold from its stored position as shown in FIG. 8. The main rotor assembly 112 is released from the bracket frame 730. The landing gear 310 and the main rotor 112 approach their in-flight positions. [[What provides the impetus for the helicopter to move out of the bracket frame?]]

Finally, the helicopter 10 reaches its fully deployed position as shown in FIG. 9. At this point, the helicopter is ready for a controlled landing on its target destination.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on-demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically or optically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various Figures (including component diagrams) shown and discussed herein are for illustrative purposes only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

We claim:

1. A helicopter using an electric propeller torque arm to drive the main rotor, comprising:
    a set of main rotor blades that rotates around a main central axis of the helicopter, the main rotor blades being driven directly by the electric propeller torque arm to produce a lift, the main rotor blades imparting no torque on a helicopter fuselage, thereby eliminating a need for a tail rotor system;
    an autorotation function enabling safe autorotation and landing in the event of a power system failure in the helicopter,
    the electric propeller torque arm drive mechanism significantly enhancing a main rotor efficiency and an autorotation effectiveness, resulting in safer autorotation landings; wherein
    the helicopter employs a central-cylinder bracket-type reentry cabin, the reentry cabin using a solid propellant rocket engine for deceleration and braking, the helicopter is stored in a folded state in a reentry cabin cylinder, and as the reentry cabin cylinder decelerates, the helicopter unfolds from a top of the cylinder and, following pre-rotation driven by the electric propeller torque arm, separates from the reentry cabin and transitions into an autorotation descent flight mode.

2. The helicopter according to claim 1, wherein:
    the helicopter operates in a free-flywheel rotation state, the maximum RPM of the main rotor being increased accordingly, thereby achieving greater maximum lift.

3. The helicopter according to claim 2, wherein:
the rotor is designed with a high lift-to-drag ratio airfoil and a larger rotor blade projection area than those of traditional helicopters, resulting in higher rotor lift.

4. The helicopter according to claim 1, wherein:
the main rotor of the helicopter operates in a free-flywheel rotation state, and the helicopter has a safe autorotation landing function such that if the fault monitoring system detects a problem with a main motor system, the fault monitoring system immediately initiates an emergency autorotation landing procedure.

5. The helicopter according to claim 1, wherein:
a main rotor system and a landing gear system of the helicopter is folded and stored in a reentry cabin, mechanical arms and manipulators used to fold and unfold the main rotor system and the landing gear system are installed on the reentry cabin.

6. The helicopter according to claim 1, wherein:
coaxial steering propellers are installed on the outer sides of two front wheels of the helicopter for in-flight steering, the propellers operating only when steering of the helicopter is required during flight.

7. The helicopter according to claim 1, wherein:
two charging piles move on a landing platform to clamp a battery pack, remove the battery pack, and replace the battery pack with a fully charged unit.

\* \* \* \* \*